United States Patent [19]

Pyeatte et al.

[11] 4,181,909
[45] Jan. 1, 1980

[54] METHOD AND APPRATUS FOR INITIALIZING REMOTE DATA COMMUNICATION EQUIPMENT

[75] Inventors: Samuel C. Pyeatte, Granger, Utah; Michael M. Austin, Bad Soden am Taunus, Fed. Rep. of Germany

[73] Assignee: Sperry Rand Corporation, New York, N.Y.

[21] Appl. No.: 874,377

[22] Filed: Feb. 2, 1978

[51] Int. Cl.² .............................................. H04Q 9/04
[52] U.S. Cl. ............................. 340/147 SY; 179/2DP
[58] Field of Search .................... 179/2 DP, 2 EC; 364/200, 900; 340/146.1 D, 147 SY; 325/64

[56] References Cited

U.S. PATENT DOCUMENTS

| 3,719,890 | 3/1973 | Borciani et al. | 179/2 DP |
| 3,836,726 | 9/1974 | Wells et al. | 325/64 |
| 3,846,783 | 11/1974 | Apsell et al. | 325/64 |
| 3,869,577 | 3/1975 | Couturier et al. | 179/2 DP |
| 3,942,152 | 3/1976 | Pettersson | 340/146.2 |
| 4,051,326 | 9/1977 | Badagnani et al. | 179/2 DP |

Primary Examiner—William C. Cooper
Attorney, Agent, or Firm—Calvin E. Thorpe

[57] ABSTRACT

Apparatus associated with a remote communication station responds to predetermined sequences of characters received over a communication channel by initializing or conditioning equipment located at the remote station. The predetermined sequences include a plurality of synchronization characters followed by a plurality of identification characters, the latter of which identify the nature of the initialization or conditioning to occur at the remote station. The apparatus "looks" bit by bit at received data to determine when a synchronization character is received. When such a character is detected, the apparatus "looks" at the succeeding characters on a character by character basis to ascertain whether the predetermined sequence of characters is received. For each character received, a programmable read only memory produces an output which is compared with reference signals produced by another programmable read only memory. If a mismatch occurs, the apparatus is reset to again "look" at the received data on a bit by bit basis. If matches occur for the remaining characters of the sequence, then the apparatus signals the remote station equipment to initialize or condition the equipment in accordance with the identification characters received.

16 Claims, 8 Drawing Figures

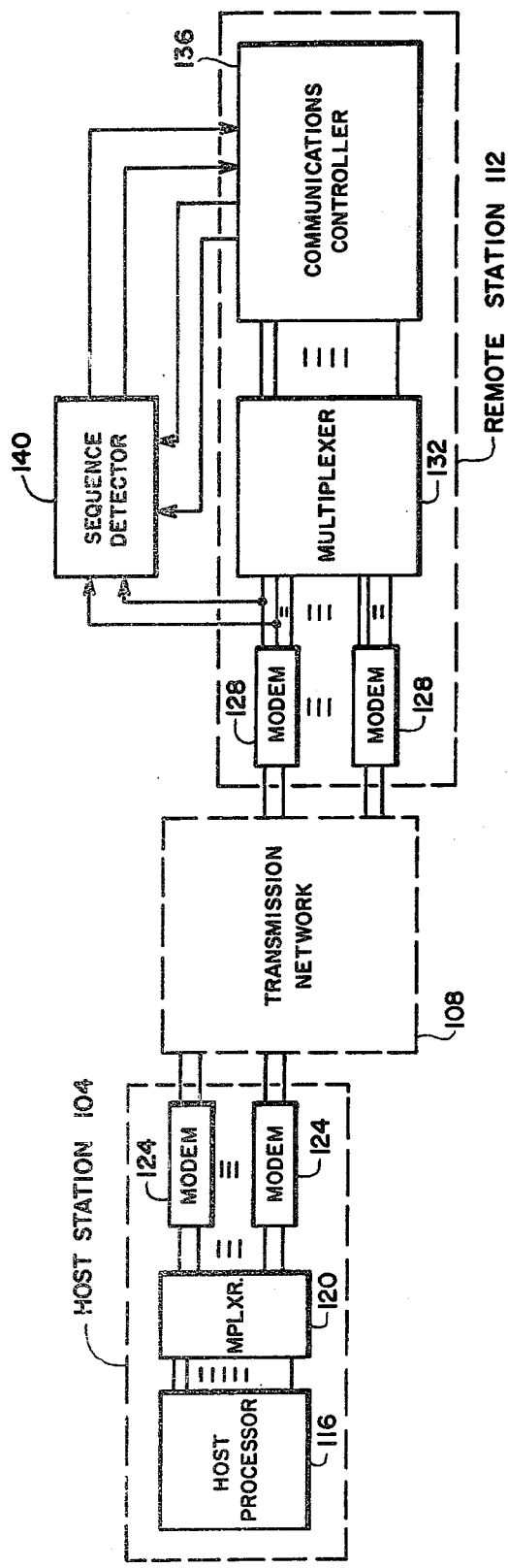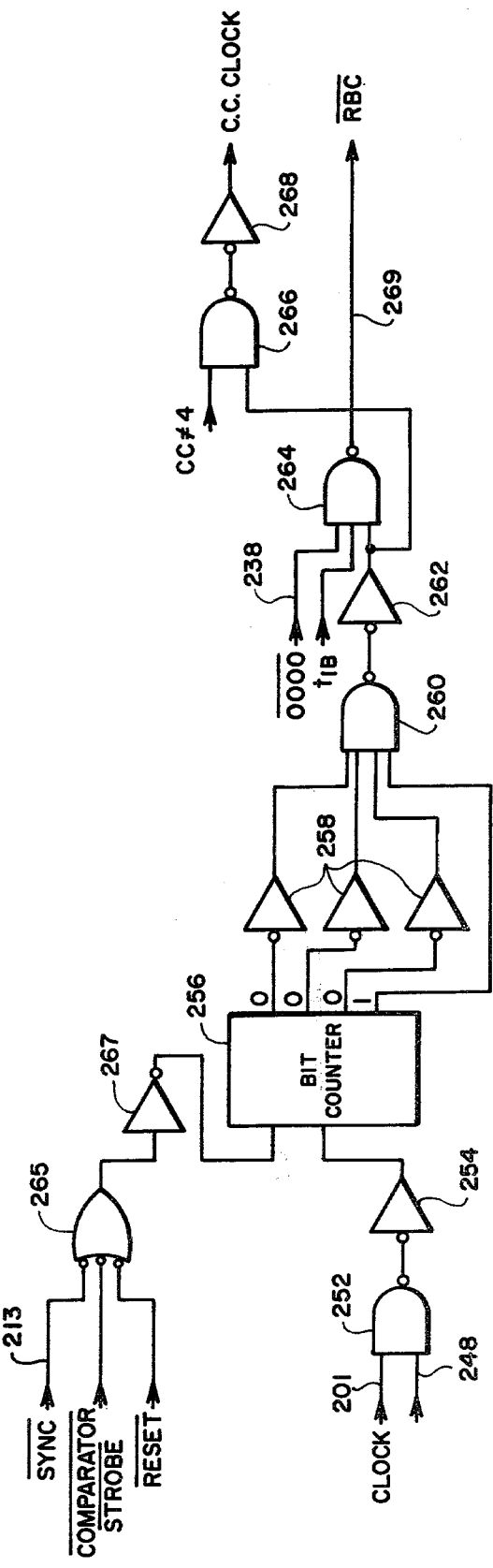

FIG. 3

| Character Received | Output of 8-bit Reg. 202 (A7 A6 A5 A4 A3 A2 A1 A0) | Output of PROM 204 (QD QC QB QA) | Count of Character Counter 222 | Output of Character Counter 222 (A4 A3 A2 A1 A0) | Output of PROM 224 (QD QC QB QA) | Output of PROM 226 (QD QC QB QA) |
|---|---|---|---|---|---|---|
| SYNC | 0 0 0 1 0 1 1 0 | 0 0 0 1 | | | 1 1 1 1 | 1 0 0 1 |
| SYNC | 0 0 0 1 0 1 1 0 | 0 0 0 1 | 0 | 0 0 0 0 0 | 1 1 1 1 | 0 0 0 0 |
| SYNC | 0 0 0 1 0 1 1 0 | 0 0 0 1 | 1 | 0 0 0 0 1 | 1 1 1 1 | 0 0 0 0 |
| SYNC | 0 0 0 1 0 1 1 0 | 0 0 0 1 | 2 | 0 0 0 1 0 | 1 1 1 1 | 0 0 0 0 |
| SYNC | 0 0 0 1 0 1 1 0 | 0 0 0 1 | 3 | 0 0 0 1 1 | 1 1 1 1 | 0 0 0 0 |
| — — — | — — — | — — — | 4 | 0 0 1 0 0 | — — — | — — — |
| ~ | — — — | — — — | — | — — — — — | — — — — | — — — — |
| DLE | 0 0 0 1 0 0 0 0 | 1 0 0 0 | 5 | 0 0 1 0 1 | 0 1 0 0 | 0 0 0 0 |
| STX | 0 0 0 0 0 0 1 0 | 0 1 1 1 | 6 | 0 0 1 1 0 | 0 0 0 0 | 0 0 0 0 |
| ETX | 0 0 0 0 0 0 1 1 | 0 0 1 0 | 7 | 0 0 1 1 1 | 0 0 1 0 | 0 0 0 0 |
| DEL | 1 1 1 1 1 1 1 1 | 1 1 1 0 | 8 | 0 1 0 0 0 | 1 1 1 1 | 0 0 0 0 |
| DEL | 1 1 1 1 1 1 1 1 | 1 1 1 0 | 9 | 0 1 0 0 1 | 1 1 1 1 | 0 0 0 0 |
| ~ | — — — | — — — | — | — — — — — | — — — — | — — — — |
| DLE | 0 0 0 1 0 0 0 0 | 1 0 0 0 | 10 | 0 1 0 1 0 | 0 0 0 0 | 0 0 0 0 |
| H | 0 1 0 0 1 0 0 0 | 0 1 0 1 | 11 | 0 1 0 1 1 | 0 0 1 0 | 0 0 0 0 |
| SOH | 0 0 0 0 0 0 0 1 | 0 0 1 0 | 12 | 0 1 1 0 0 | 0 0 0 1 | 0 0 0 0 |
| ~ | — — — | — — — | — | — — — — — | — — — — | — — — — |
| DLE | 0 0 0 1 0 0 0 0 | 1 0 0 0 | 13 | 0 1 1 0 1 | 0 0 0 0 | 0 0 0 0 |
| 7 | 0 0 1 1 0 1 1 1 | 0 1 1 0 | 14 | 0 1 1 1 0 | 0 0 0 1 | 0 0 0 0 |
| DLE | 0 0 0 1 0 0 0 0 | 1 0 0 0 | 15 | 0 1 1 1 1 | 0 0 0 0 | 0 0 0 0 |
| EOT | 0 0 0 0 0 1 0 0 | 0 0 0 1 | 16 | 1 0 0 0 0 | 0 0 1 0 | 0 0 0 0 |
| ~ | — — — | — — — | — | — — — — — | — — — — | — — — — |
| BR | 0 0 0 0 0 X X X | | | | | |

METHOD AND APPRATUS FOR INITIALIZING REMOTE DATA COMMUNICATION EQUIPMENT

BACKGROUND OF THE INVENTION

The present invention relates generally to the detection of predetermined sequences of data characters and, more particularly, to the use of such detection at remote communication stations for conditioning or initializing, without operator intervention, equipment located at such stations.

There are a variety of private communication networks designed either for data transmission, oral communication, or both. Although such private communication networks oftentimes have distinctive features, one farily common feature in the organization of such networks is to provide one or more so-called host stations centrally located and staffed with maintenance personnel, and a plurality of remote stations which operate under the control of a host station and typically are unattended. The host stations include data processing and control equipment for controlling the remote stations to establish communication links and to provide for transmission of information over those links. The remote stations might include so-called communications controllers such as Sperry Univac's Communications Controller 3760. This controller is essentially a computer or data processor which operates in accordance with stored programs and typically includes, in addition to a core memory, disc or tape memory systems for storing the programs.

One problem with communication networks of the type described is that if a problem occurs with the equipment at a remote station, the remote station may be disabled and, in effect, lost for several hours until maintenance personnel can arrive at the station to remedy the problem. Examples of such problems are power interruptions which result in loss of information stored in core memory, errors which occur while loading information into core memory from tape or disc, etc. Problems such as these generally require reinitialization or reloading or programs into the core memory and this cannot be done under control of the communications controller located at the remote station since it is the controller which is disabled.

Remote reinitialization or reloading of the communications controller would be desirable since it would obviate the need to send maintenance personnel to the remote station and this would save both time and money. If such remote reinitialization were employed, it would be important to protect against accidental reinitializations which might disrupt valid operation of the controller. Thus, some secure and reliable method of signalling the remote station would be needed.

SUMMARY OF THE INVENTION

It is another object of the present invention to provide a novel and reliable method and apparatus for initializing or conditioning remote communication equipment.

It is an object of the present invention to provide such a method and apparatus which operates independently of the remote station equipment.

It is a further object of the present invention to provide such a method and apparatus for initializing equipment at a remote station without the need for operator intervention.

It is still another object of the present invention to provide apparatus which uses the transmission channel connected to a remote station to receive predetermined sequences of data characters without impairing the normal flow of data to the station.

It is also an object of the present invention to provide a method and apparatus for reliably detecting predetermined sequences of characters.

It is an additional object of the present invention to provide such a method and apparatus in which the specific predetermined sequence to be detected may be changed without requiring significant change in the apparatus.

It is another object of the present invention to provide such a method and apparatus in which the length of the predetermined sequence may be varied.

These and other objects of the invention are realized in a specific illustrative embodiment of apparatus capable of detecting a predetermined sequence of data characters, where the sequence includes a plurality of synchronization characters followed by a plurality of identification characters. The apparatus advantageously is used at a remote data communication station to initialize or condition the remote station equipment in response to receipt of the predetermined sequence. The apparatus includes circuitry for receiving and storing data transmitted over the transmission channel of the remote station, circuitry for producing a synchronization (sync) indication signal when a particular sequence of bits is received, and circuitry for comparing with reference signals the characters received subsequently to production of the sync indication signal. If, following production of the sync indication signal, at least a predetermined number of synchronization characters are received followed by a predetermined number of identification characters, then the apparatus produces an initialization signal which is applied to the remote station equipment to initialize or condition the equipment. Any number of synchronization characters beyond the predetermined number may be received without disrupting the sequence detection operation. Then, provided the identification characters are received following the last synchronization character, the initialization signal will be produced by the apparatus. Receipt of other than the predetermined sequence will result in a mismatch so that no initialization of the remote station equipment occurs. The predetermined sequence is designed such that accidental occurrence or duplication of the sequence would be very unlikely.

The sequence detection apparatus employs programmable read only memories (PROMs) for carrying out the comparing process and by reason of such use, the specific sequence to be detected may be changed by simply changing the PROMs. The other logic circuitry of the apparatus need not be changed.

The sequence detection apparatus is coupled to the transmission channel over which data is transmitted to the remote station so that data transmitted over the channel is received both by the apparatus and the remote station. Receipt of data and operation of the apparatus thus does not interfere with or require participation of the remote station equipment.

BRIEF DESCRIPTION OF THE DRAWINGS

The above and other objects, features and advantages of the present invention will become apparent from a consideration of the following detailed description presented in connection with the accompanying drawings in which:

FIG. 1 is a block diagram graphically showing an exemplary communication network in which the detection apparatus of the present invention may be utilized;

FIGS. 2A through 2E show illustrative logic circuitry for the sequence detector 140 of FIG. 1;

FIG. 3 is a table showing illustrative coding for the PROMs of FIG. 2A; and

DETAILED DESCRIPTION

Figure 2A:
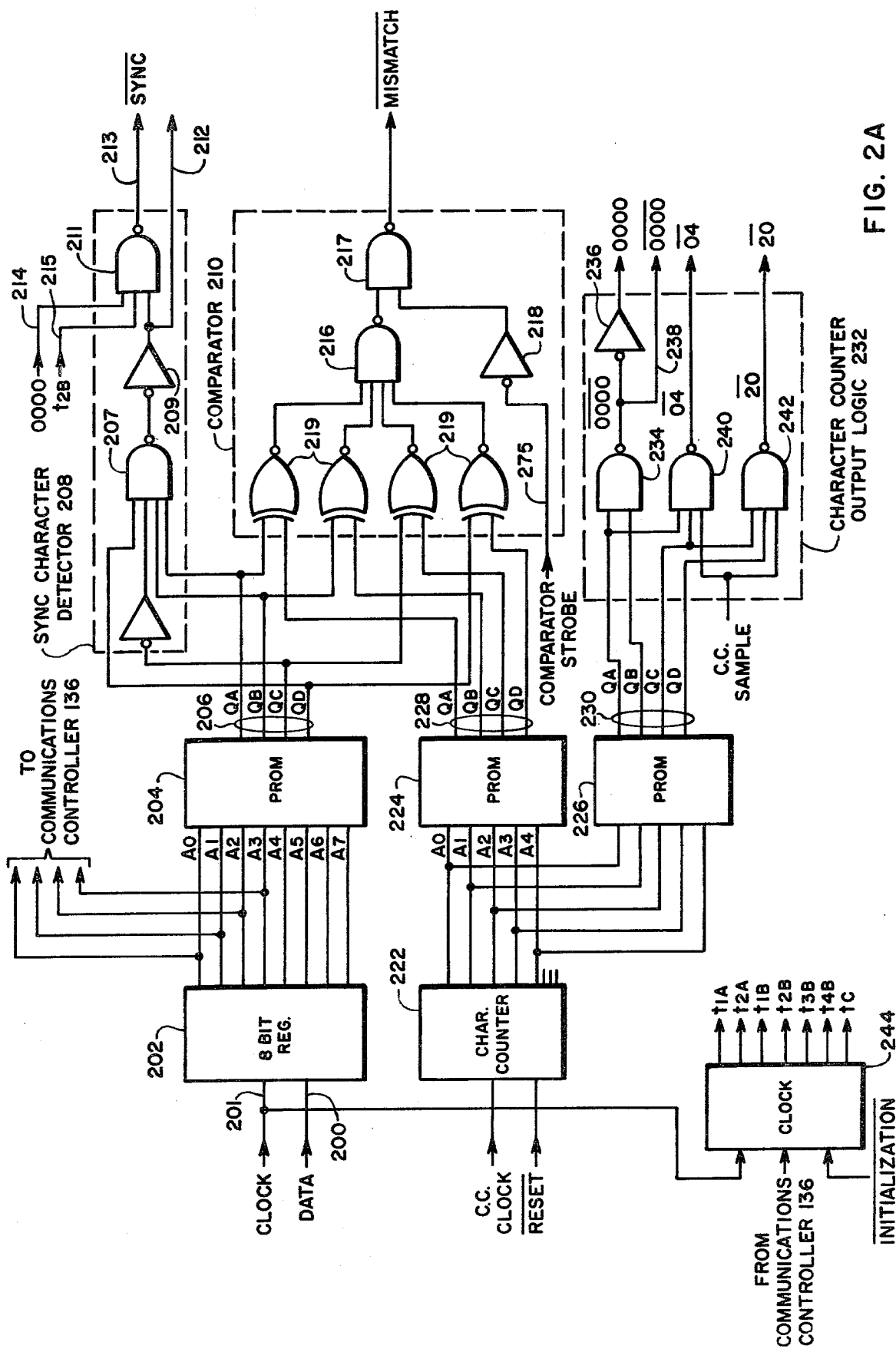

Referring to FIG. 1, there is shown graphically a portion of an illustrative communication network organized with host stations and remote stations. Specifically, a host station 104 is shown coupled by way of a transmission network 108 to a remote station 112. The host station 104 might illustratively include host data processor 116 which is coupled by way of a multiplexer 120 and a plurality of modulator/demodulators (modems) 124 to the transmission network 108. The host processor 116 might illustratively be a conventional data processing system for controlling establishment of communication links and communication of data among the host station 104, other host stations, and remote stations which form a part of the overall communication network. The host processor 116 may communicate simultaneously via the different modems 124 to different remote stations. All this is considered conventional and does not form any part of the present invention.

The remote station 112 also includes a plurality of modems 128 which interconnect the transmission network 108 to a multiplexer 132. The multiplexer in turn is coupled to a communications controller 136. Illustratively, the communications controller 136 could be the Sperry Univac 3760 Communications Controller which is a stored program control unit. This unit, which is described in the Sperry Univac 3760 Communications Controller General Description Manual No. UP-7976 Rev. 1, includes a processor, core memory, data storage units such as tape or disc storage units, and control circuitry for controlling transfer of data or programs from the storage units to the core memory.

Although only a single host station 104 and single remote station 112 are shown, it should be understood that a plurality of such host stations and remote stations might be connected to the transmission network 108, each station being capable of communicating with the other stations. Again, this is a conventional way of organizing communication networks and is not considered a part of the present invention.

A sequence detector 140, made in accordance with the principles of the present invention, is coupled to a pair of lines connecting a modem to the multiplexer 132. The sequence detector 140 is also coupled to the communications controller 136. One of the lines coupling the modem 128 to the multiplexer 132 to which the sequence detector 140 is connected carries serial data, and the other line carries clock or timing information transmitted by the host station 104. The sequence detector 140 monitors the data being transmitted over the data line and, when a particular sequence of bits is received, begins comparing subsequently transmitted characters with certain reference signals to ascertain whether a certain predetermined sequence of characters is received. The function of this sequence is to alert the sequence detector 140 that the communications controller 136 is malfunctioning and that certain corrective action is to be initiated. The host station 104 may learn of the malfunction of the communications controller 136 by reason of a failure to receive a response from the controller when certain data is transmitted to it, by receipt of an erroneous response, etc.

Of course, it is important that the sequence detector 140 not initiate corrective action unless the communications controller 136 is in fact malfunctioning. Otherwise, correct functioning of the communications controller 136 may be interrupted and data transmission over the communications network may thus be disrupted. Selection of a character sequence which is unlikely to occur by accident imperative to avoid initiation of unneeded corrective action.

Coupling the sequence detector 140 to the two input lines of the multiplexer 132 allows the sequence detector to carry out its functions without disrupting normal flow of data to the multiplexer and thus to the communications controller 136. Thus, the sequence detector 140 does not detract from the normal operation of the communication network, only coming into play when there is a problem with the communications controller 136. Examples of such problems were mentioned earlier and could include power interruptions which result in a loss of program from the core memory of the communications controller, erroneous transfer of a program from tape or disc to the core memory, etc. An illustrative embodiment of the sequence detector 140 will next be discussed.

FIGS. 2A through 2E show an illustrative embodiment of the sequence detector 140 (FIG. 1) suitable for detecting the predetermined sequences transmitted by the host station while allowing flexibility in the length of the predetermined sequences and in the specific sequences used. Operation of the embodiment of composite FIG. 2 will be generally described before discussing the details of the logic shown in the FIG.

When the host station determines that the communications controller at the remote station is not operating properly and needs to be initialized, it transmits to the remote station a predetermined character sequence which includes at least six synchronization characters at the beginning of the sequence. The transmitted characters, which are eight bits in length, are received serially over a data line 200 (FIG. 2A) and stored in an eight bit register 202. The sequence detector of composite FIG. 2 is conditioned to "look" for a synchronization character on a bit by bit basis until a first such character is "recognized". When a synchronization character is "recognized", whether or not such recognition is valid, a bit counter 256 (FIG. 2E) is enabled to begin counting the subsequently received bits. After eight such bits are received, indicating a complete character has been received, a character counter 222 (FIG. 2A) is incremented by one. The output of the character counter 222 and the contents of the register 202 are applied to respective programmable read only memories (PROMs) 204 and 224 which produce outputs in response thereto. These outputs are compared and, if they do not match, then what was "recognized" as the first synchronization character must not in fact have been such, and the sequence detector logic is reset to again "look" on a bit by bit basis for a synchronization character. If the outputs match, then the sequence detector continues the character by character comparison process until either a mismatch occurs or it is determined that the correct predetermined sequence has been received. If the predetermined sequence is detected, then the sequence detector produces an initialization signal which is applied to the communications controller 136 of FIG. 1.

After "recognition" of a certain number of synchronization characters at the beginning of a sequence, the sequence detector assumes an "idle" mode of operation in which any synchronization characters received after that are simply ignored. The reason for this is to enable a host station to send any number of synchronization characters without disrupting the operation of the sequence detector. Thus, for host stations which must transmit to a remote station over a transmission line more likely to be subject to errors, the host station may be adapted to send more synchronization characters to better insure that the sequence detector at the remote station is properly synchronized. The details of the circuitry of FIGS. 2A through 2E will now be described.

The register 202 of FIG. 2A is coupled to the "data" line 200 and a "clock" line 201 for receiving data and timing signals from the host station. The data is received serially over lead 200 and shifted into the register 202 in response to clock signals received over lead 201.

The register 202 is coupled in parallel to PROM 204 which is programmed to decode the contents of the register 202 and produce a four-bit reference output on leads 206. This output is applied to a synchronization character detector 208 and also to a comparator 210. The synchronization character detector 208 is provided to detect receipt of so-called synchronization characters. When a synchronization bit pattern is present in the register 202, PROM 204 produces a binary output of 1011 on output leads 206 which causes a NAND gate 207 of the detector 208 to produce a "zero" or "low" output. This output is inverted by an inverter 209 to a "one" or "high" signal which is applied to another NAND gate 211 and to a lead 212. The presence of a high signal on lead 212 indicates that a synchronization character has been "recognized" as having been registered in the register 202.

Each time a bit is shifted into the register 202, the PROM 204 "decodes" the contents of the register and produces an output on leads 206. Thus, the incoming data is examined on a bit by bit basis to ascertain receipt of a synchronization character so that the sequence detector 140 (FIG. 1) can be synchronized. It should be understood that what is "recognized" as a synchronization character may not in fact be a synchronization character but rather may be either an erroneous character or the tail portion and beginning portion of two other characters which together have the same bit pattern as a synchronization character. This problem of erroneous detection of a synchronization character and how the problem is handled will be discussed later.

Application of a high signal to NAND gate 211 (FIG. 2A) by inverter 209, together with a high signal on input lead 214 from a character counter output logic 232 and a high signal $t_{2B}$ on input lead 215 from a clock 244, causes the NAND gate to produce a low output signal on lead 213. The high signal on lead 214 is produced by the logic 232 in response to a 0011 output from a PROM 226. The PROM 226 produces this output in response to a zero count in character counter 222. In particular, the character counter 222 registers a count of zero prior to receipt of a synchronization character, and this zero count is "decoded" by the PROM 226 to produce the output applied to the logic 232. This output includes two high signals which are supplied to a NAND gate 234 and the NAND gate, in turn, supplies a low signal to inverter 236 and to output lead 238. The low signal is inverted by the inverter 236 to a high signal which is supplied to the NAND gate 211.

Figure 2B:
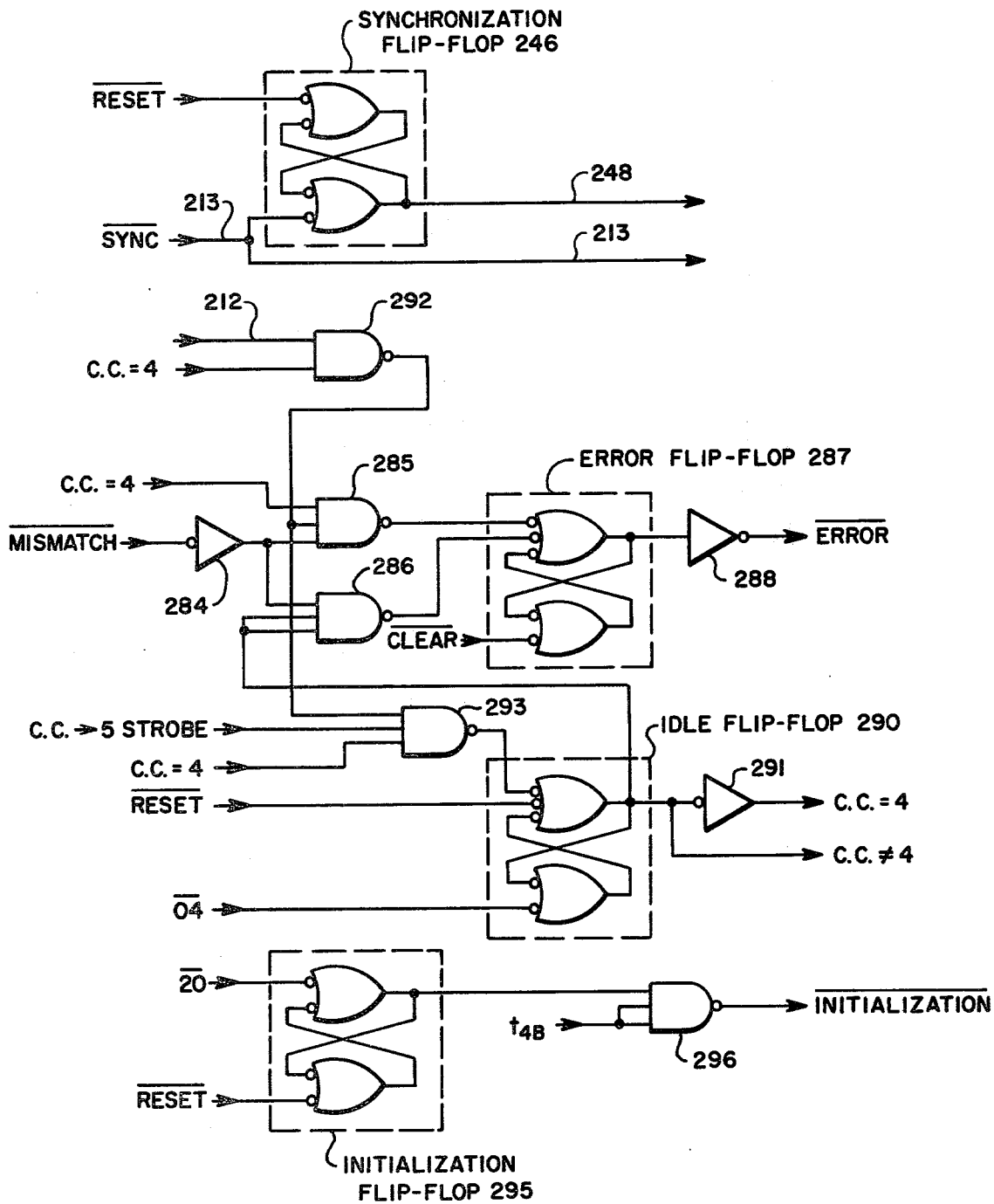

The low signal produced by the NAND gate 211 of the detector 208 is supplied via lead 213 to a synchronization flip-flop 246 as shown in FIG. 2B and to an OR-NOT gate 265 shown in FIG. 2E. The OR-NOT gate 265 is thus enabled to produce a high output signal which is inverted to a low signal for application to a bit counter 256. This resets the bit counter to insure that it is cleared to zero in preparation for carrying out operations to be described momentarily.

The low signal supplied via lead 213 to the synchronization flip-flop 246 (FIG. 2B) sets the flip-flop causing it to produce a high output on lead 248 which is applied to a NAND gate 252 of FIG. 2E. Connected to the other input of NAND gate 252 is a lead 201 over which clock signals from the host station are applied each time a bit is transmitted by the host station. With a constant high signal being supplied to NAND gate 252 (as long as the synchronization flip-flop 246 is set), upon receipt of each clock signal over lead 201 the NAND gate 252 will produce a low signal which is inverted to a high signal by inverter 254 for application to the bit counter 256. The counter 256 is thus caused to increment its counts by one with each bit transmitted by the host station.

The function of the counter 256 is to count the bits received and to produce an output after reaching a count of eight to thereby indicate the receipt of a complete character. In this manner, the sequence detector of composite FIG. 2 will be synchronized for the incoming character sequence. This of course assumes that the character "recognized" as a synchronization character was in fact a true synchronization character and not merely parts of two other characters which together appear to be a synchronization character.

When the bit counter 256 of FIG. 2E reaches a count of eight, the output of the counter (a portion of which is applied via inverters 258) causes enablement of a NAND gate 260 to produce a low output signal which is supplied to an inverter 262 which inverts the signal to a high signal for application to a NAND gate 264 and also to a NAND gate 266. The signal applied to NAND gate 266 together with a high signal on the other input of the NAND gate (which occurs when the character counter 222 [FIG. 2A] produces a count other than four) causes the NAND gate to produce a low signal which is inverted to a high signal by inverter 268. This high signal is then applied to the character counter 222 of FIG. 2A to cause the counter to increment its count by one indicating that a character has been received.

For each character received following "recognition" of a synchronization character, the character counter 222 is incremented by one and the output of the counter is utilized in a comparison process to determine if a certain sequence of characters is received. This comparing operation takes place on a character by character basis as previously mentioned. The comparing process is initiated by the bit counter 256 reaching a count of eight. In particular, NAND gate 260 (FIG. 2E) produces a low signal which causes the inverter 262 to apply a high signal to NAND gate 264 as previously described. One of the other two inputs to the NAND gate 264 is supplied by NAND gate 234 of the character counter output logic 232 of FIG. 2A. This input is high when the count in the character counter 222 is other than zero which, at this stage of operation, is the case since the character counter has been incremented to a count of one. The other input lead to NAND gate 264 (FIG. 2E) is from the clock 244 (FIG. 2A) and a high signal $t_{1B}$ is periodically applied over this lead to enable NAND gate 264 causing it to produce a low output signal. It is this low output signal that initiates the comparison operation.

Figure 2C:
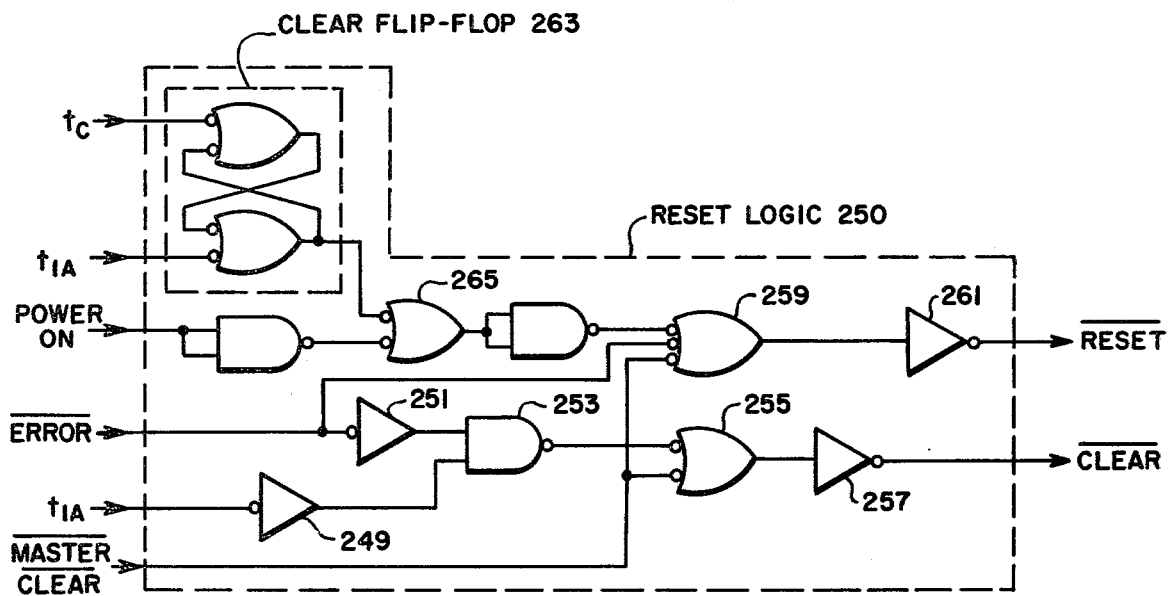
Figure 2D:
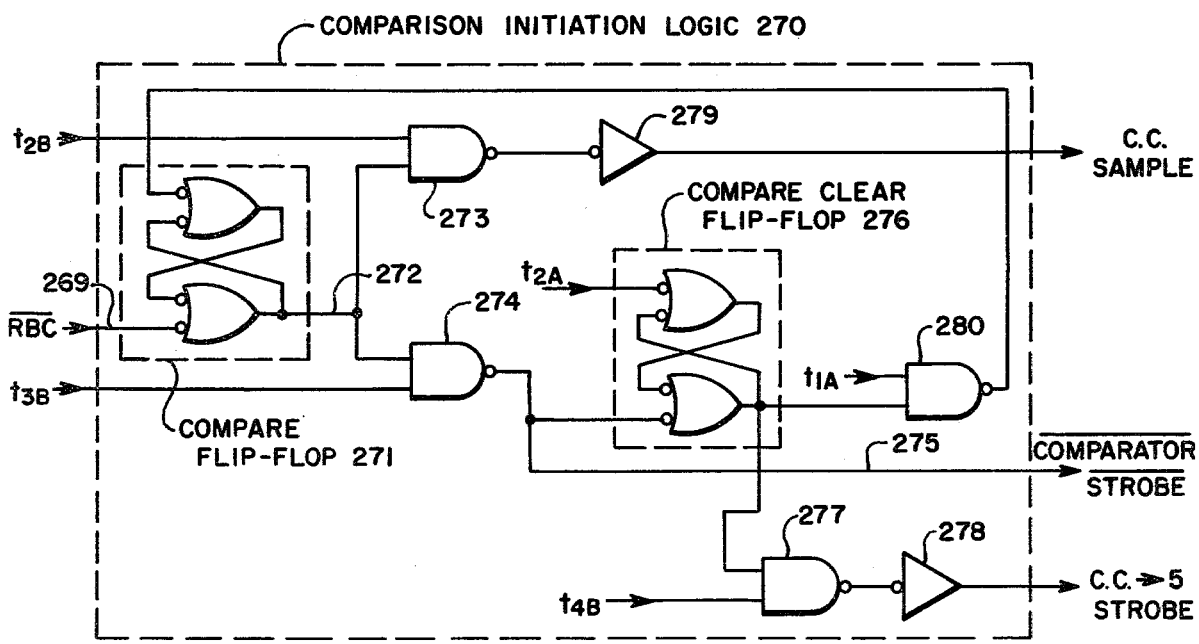

The low signal produced by NAND gate 264 of FIG. 2E is supplied via lead 269 to comparison initiation logic 270 of FIG. 2D. Specifically, the signal is applied to a compare flip-flop 271 to set the flip-flop causing it to produce a high output signal on lead 272. This high signal is applied to two NAND gates 273 and 274, the latter of which is caused to produce a low output signal upon receipt of a high clock signal $t_{3B}$ on the other input of the NAND gate 274. The low output signal is applied to a lead 275 and functions as a strobe for the comparator 210 of FIG. 2A and to reset the bit counter 256 (FIG. 2E) via the OR-NOT gate 265 and the inverter 267. The high signal applied to NAND gate 273, together with a clock signal $t_{2B}$, causes the NAND gate 273 to produce a low signal which is applied to an inverter 279. The inverter 279 thus produces a high "C.C. sample" signal which is supplied to the character counter output logic 232 of FIG. 2A for purposes to be described later.

Each character received following "recognition" of a synchronization character is decoded by PROM 204 (FIG. 2A) which produces an output on leads 206 depending upon the character received. Also, the count in character counter 222 is incremented upon receipt of each such character and the output of the counter is supplied to a PROM 224 which decodes the output and produces a reference output on leads 228. The output from PROM 204 is then compared with the output from PROM 224 by the comparator 210. The result of this comparison is indicated by the output of a NAND gate 217 which is enabled by the comparator strobe signal (earlier discussed) applied to lead 275. This low comparator strobe signal is inverted by an inverter 218 to a high signal which enables the NAND gate 217. If the outputs from PROM 204 and PROM 224 match, then EXCLUSIVE-OR gates 219 produce high outputs which cause a NAND gate 216 to produce a low output signal. The NAND gate 217 is thus caused to produce a high output signal indicating a match. If the outputs from PROM 204 and 224 do not match, then one or more of the EXCLUSIVE-OR gates 219 produces a low signal and NAND gate 216 is caused to produce a high output. This high output combines with the high output of the inverter 218 to cause NAND gate 217 to produce a low output signal indicating a mismatch.

If the comparator 210 produces a signal indicating a mismatch, this means that the sequence of bits which was "recognized" as being a synchronization character was in fact not a synchronization character and so the circuitry of the sequence detector of composite FIG. 2 will be reset to commence "looking" for a true synchronization character. This resetting occurs by application of the low "mismatch" signal produced by NAND gate 217 to an inverter 284 of FIG. 2B. This inverter inverts the low signal to a high signal which is applied to NAND gates 285 and 286. As will be discussed later, the other input of NAND gate 286 is high except when the character counter 222 is registering a count of 4, at which time the other input is low. With the application of a high signal by the inverter 284 to the NAND gate 286, the NAND gate is caused to produce a low output signal which is applied to an error flip-flop 287 to set the flip-flop. The flip-flop is thus caused to produce a high output signal which is inverted by an inverter 288 to a low signal. This low signal is applied to reset logic 250 of FIG. 2C and in particular to an inverter 251. The inverter 251 inverts the signal to a high signal for application to a NAND gate 253. This high signal, together with a low clock signal $t_{1A}$ (which is inverted to a high signal by inverter 249) causes the NAND gate 253 to produce a low output which is applied to OR-NOT gate 255 which, in turn, produces a high output signal for application to an inverter 257. The inverter inverts the high signal to a low "clear" signal which is applied to error flip-flop 287 of FIG. 2B to reset the flip-flop.

The low "error" signal received by reset logic 250 of FIG. 2C is also applied to an OR-NOT gate 259 which produces a high signal in response thereto for application to an inverter 261. The inverter 261 inverts the high signal to a low "reset" signal. This low "reset" signal is applied to the synchronization flip-flop 246, to an idle flip-flop 290, and to an initialization flip-flop 295, all shown in FIG. 2B, to reset the named flip-flops. The "reset" signal is also applied to the character counter 222 of FIG. 2A to reset the counter and to the OR-NOT gate 265 of FIG. 2E to cause resetting of the bit counter 256. Upon resetting of the logic indicated, the sequence detector of composite FIG. 2 is ready to again "look" for receipt of a synchronization character on a bit by bit basis as before described.

If the comparator 210 (FIG. 2A) produces a high signal indicating a match between the outputs of PROM 204 and 224, then no general resetting of the logic occurs. However, the bit counter 256 of FIG. 2E will have been reset by the "comparator strobe" pulse produced by the comparison initiation logic 270 of FIG. 2D. In particular, the "comparator strobe" signal is applied to OR-NOT gate 265 which produces a high output signal for application to the inverter 267 which inverts the signal to a low signal for resetting the bit counter 256. The bit counter is then ready to commence counting upon receipt of the first bit of the next succeeding character transmitted by the host station.

Since the host station sends at least six synchronization characters at the beginning of the predetermined sequence used to initialize a remote communication station, the next several characters received after "recognition" of the initial synchronization character will also be synchronization characters. The purpose of having multiple synchronization characters, as indicated earlier, is to insure that the sequence detector is properly placed in synchronization, i.e., that it is placed in synchronization upon receipt of valid synchronization characters rather than characters or bit sequences which appear to be synchronization characters through error but are not. Also, if through error the end portion of a valid synchronization character and the beginning portion of a succeeding valid synchronization character together appear to be a synchronization character, then the sequence detector would assume a false synchronization with the incoming character sequence. The next eight bits thought to be a character would result in a mismatch even though the sequence being received was in fact a valid one. By providing multiple synchronization characters, the sequence detector is given more time to reach synchronization and to overcome any premature or false synchronization starts. It is felt that at least six synchronization characters at the beginning of the sequence to be detected is suitable. As also earlier indicated, any number of synchronization characters more than a certain minimum may be utilized and the sequence detector will not be adversely affected.

Assuming that a correct sequence is being received, upon receipt of each synchronization character at the beginning of the sequence, the bit counter 256 of FIG. 2E will cause production of a "character counter clock" signal which is supplied to the character counter 222 (FIG. 2A) to cause the counter to increment by one. After each such incrementing, a comparison is made between the outputs of PROMs 204 and 224 and these PROMs will have been programmed to produce matching outputs for receipt of valid synchronization characters. When the character counter 222 reaches a count of four (indicating that five synchronization characters have been received—the first synchronization character "recognized" did not cause the character counter to increment), the PROM 226 produces an output which, together with a "CC sample" signal from the comparison initiation logic 270 of FIG. 2D, causes NAND gate 240 to produce a low signal. This low signal is applied to the idle flip-flop 290 of FIG. 2B to set the flip-flop and cause it to produce a low output. This low output is inverted by an inverter 291 to a high signal which represents that the count in the character counter 222 of FIG. 2A is four. The low output from the idle flip-flop 290 is applied to the NAND gate 286 so that no subsequent "mismatch" signals applied to the inverter 284 will cause enablement of the NAND gate 286. Thus, the error flip-flop 287 cannot be set as a result of a "mismatch" signal. Then, as long as the subsequently received characters are synchronization characters, the error flip-flop will not be set even though the decoded output of the character counter 222 and decoded contents of the register 202 (FIG. 2A) do not match.

Setting of the idle flip-flop 290 places the sequence detector of composite FIG. 2 in a so-called "idle" mode of operation, the purpose of which is to allow receipt of multiple synchronization characters without disrupting the sequence detector logic. When in the "idle" mode, the character counter 222 (FIG. 2A) is prevented from incrementing upon receipt of further synchronization characters. This is because the output of the idle flip-flop 290 of FIG. 2B is applied to the NAND gate 266 of FIG. 2E and so the NAND gate is disabled. That is, with a low input to NAND gate 266, the high signals produced by the inverter 262 each time the bit counter 256 reaches a count of eight will have no effect on the NAND gate and thus no "character counter clock" signal will be produced to cause the character counter to increment.

When the first nonsynchronization or identification character (following the plurality of synchronization characters) is received, the output on lead 212 of the synchronization character detector 208 (FIG. 2A) is made low and this low signal disables NAND gate 292 (FIG. 2B) so that it produces a high output which is applied to NAND gates 285 and 293. This removes one of the "disabling" signals which had prevented setting of the error flip-flop 287 and resetting of the idle flip-flop 290. The receipt of an identification character also causes production of a low signal on lead 269 of FIG. 2E as a result of the bit counter 256 reaching a count of eight. This low signal is applied to the compare flip-flop 271 of FIG. 2D to set the flip-flop causing it to produce a high output on lead 272 as before discussed. Upon receipt of a high timing signal $T_{3B}$, the NAND gate 274 is enabled to produce a low output which is applied via lead 275 to the comparator 210 of FIG. 2A and also to a compare clear flip-flop 276 of the comparison initiation logic 270. This sets the compare clear flip-flop 276 causing it to produce a high output which is applied to a NAND gate 277. Upon receipt of a high timing signal $t_{4B}$, the NAND gate 277 is enabled to produce a low output and this low output is inverted to a high output by an inverter 278. The high output of inverter 278 is applied to NAND gate 293 of FIG. 2B which, together with the high signal from NAND gate 292 (FIG. 2B) and the high signal from the inverter 291 (FIG. 2B), causes the NAND gate 293 to produce a low output which resets the idle flip-flop 290 causing it to produce a high output. With the high output of the idle flip-flop 290 applied to the NAND gate 266 of FIG. 2E, the character counter 222 (FIG. 2A) is allowed to increment to a count of five to, in effect, register receipt of the first identification character.

Note that NAND gate 280 of the comparison initiation logic 270 is provided to reset the compare flip-flop 271, after setting of the compare clear flip-flop 276, all shown in FIG. 2D. The compare clear flip-flop 276 is thereafter reset by a low signal $t_{2A}$ from the clock 244 of FIG. 2A.

With the error circuitry of FIG. 2B now operational because the character counter 222 (FIG. 2A) shows other than a count of four, any mismatch signal produced by the comparator 210 (FIG. 2A) for any subsequently received identification or nonsynchronization characters will cause a setting of the error flip-flop 287 (FIG. 2B) which, in turn, will cause a resetting of the sequence detector logic of composite FIG. 2. On the other hand, as long as the subsequently received characters are proper characters in the sequence being transmitted by the host station, no mismatch signal will be produced by the comparator 210 and the character counter 222 (FIG. 2A) will continue to increment upon receipt of each character.

When the character counter 222 reaches a count of 20, the output of PROM 226, together with the "CC sample" signal from the comparison initiation logic 270 of FIG. 2D, will cause enablement of NAND gate 242 of the character counter output logic 232 of FIG. 2A. Enablement of NAND gate 242 causes the NAND gate to produce a low signal (indicating that the character counter 222 has reached a count of 20) and this low signal is applied to an initialization flip-flop 295 (FIG. 2B) to set the flip-flop. This flip-flop thus produces a high output which is applied to a NAND gate 296 and this, together with a high timing signal $t_{4B}$, causes enablement of the NAND gate to produce an "initialization" signal which is applied to the communications controller 136 of FIG. 1. Production of the "initialization" signal means that the character sequence transmitted by the host station has been successfully detected by the sequence detector 140 (FIG. 1) so that the communications controller can be initialized.

After application of the "initialization" signal to the communications controller 136, the sequence detector 140 applies a portion of the next received character of the sequence transmitted by the host station. As shown in FIG. 2A, four of the output lines of the register 202 are coupled to the communications controller to convey four bits of the character stored in the register. These four bits are coded to indicate to the communications controller the type of initialization to be carried out. For example, the bits could be coded to indicate that the communications controller 136 was to load a program from tape, load a program from disc, receive program information from the host station, or similar function.

A number of items regarding operation of the circuitry of FIGS. 2A through 2E not previously mentioned will now be discussed. The reset logic 250 of FIG. 2C produces "reset" and "clear" signals, as already described, in response to production of an "error" signal by the error flip-flop 287 of FIG. 2B. The "reset" signal is also produced by the reset logic 250 in response to either a "power on" signal produced by the communications controller 136, a "master clear" signal received from the communications controller 136, or a clock signal $t_C$ which causes resetting of a clear flip-flop 263 so that it produces a low output signal. The clear flip-flop 263 is set at the beginning of each detection process by a clock signal $t_{1A}$. The "power on", "master clear", and $t_C$ clock signals are used to insure that the detection circuitry is reset prior to initiation of the detection process. The clock signal $t_C$ is produced by the clock 244 of FIG. 2A in response to an "initialization" signal supplied by the circuitry of FIG. 2B.

FIG. 3 shows a table displaying exemplary coding for the PROMs of FIG. 2A suitable for enabling operation of the sequence detector as described above. The first column of the table labeled "Character Received" identifies the data characters of the predetermined sequence sent by the host station to a remote station. The sequence includes at least five synchronization characters followed by sixteen identification characters. The character symbols shown, except for the "sync" symbols, are standard ASCII symbols.

The coding for the characters of the sequence is shown in the column labeled "Output of 8-Bit Reg. 202". The bits of each character are identified as $A_0$ through $A_7$ to correspond to respective output leads, similarly labeled, of the 8-bit register 202 (FIG. 2A) on which such bits appear. The output coding produced by the PROM 204 for each received character is shown in the column labeled "Output of PROM 204". Again, each bit of the output is identified (as $Q_A$ to $Q_D$) to correspond to a respective output lead of the PROM 204 of FIG. 2A. For all outputs of the 8-bit register 202 other than those shown, the output of PROM 204 is 0000 indicating an erroneous situation.

The column labeled "Count of Character Counter 222" shows the different counts produced in the designated counter for each received character, and the next column shows the corresponding binary output of the counter for each count. Finally, the last two columns of the table of FIG. 3 show the output coding produced by the PROMs 224 and 226 for each received character.

Recall that the last character in a transmitted sequence is coded to indicate what type of corrective action is to be taken by the remote station. Bits $A_0$ to $A_3$ of this character (identified as BR in FIG. 3), are shown as X's in the drawing to indicate that they could have various codings to identify the type of action to be taken.

Figure 4:
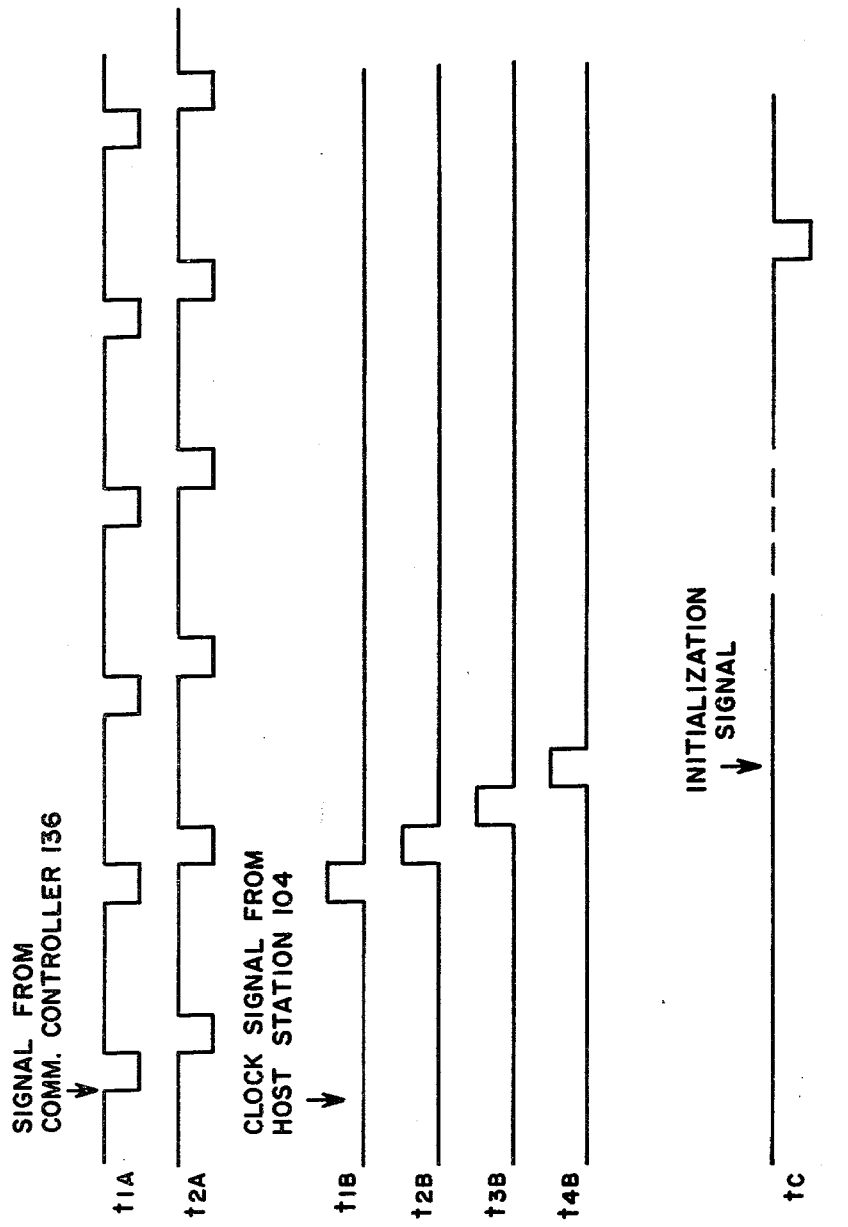
FIG. 4 is a timing diagram for the timing signals produced by clock 244 of FIG. 2A.

FIG. 4 shows a timing diagram for the clock signals produced by clock 244 of FIG. 2A. Clock signals $t_{1A}$ and $t_{2A}$ are periodic as shown and are initiated by signals from the communication controller 136. The signals $t_{1B}$ to $t_{4B}$ occur as shown after receipt of each clock signal transmitted by the host station. The clock signal $t_C$ is produced a certain period of time after generation of the "initialization" signal produced by the circuitry of FIG. 2B.

In the manner described, a secure and reliable method of signalling a remote station to initialize or condition the station is provided. The sequence detector 140 detects predetermined sequences transmitted by the host station to then condition the communications controller 136 in the manner desired. The sequence detector 140 operates independently of and without interfering with the communications controller and will only take action when certain predetermined sequences are transmitted by the host station and detected by the detector. Utilization of the PROMs in the sequence detector 140 enables selection and changing of the predetermined sequences to be used in the detection process since, if it is desired to change the sequences used, the PROMs can simply be replaced to decode the outputs of the register 202 (FIG. 2A) and character counter 222 in the manner desired. No other logic of the sequence detector need be changed.

Also, because the sequence detector 140 assumes an "idle" mode condition after receipt of a certain number of synchronization characters any number of additional synchronization characters can be transmitted by the host station without disrupting the operation of the sequence detector. That is, the length of the predetermined sequence can be varied by varying the number of synchronization characters used.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. In a data communications system having one or more host stations, one or more remote stations, and means interconnecting said stations, said host station including means for transmitting predetermined sequences of data characters over said interconnecting means to said remote station, and said remote station including data processing equipment, data storage units, and loading apparatus responsive to initialization signals for applying data to the data processing equipment from a data storage unit identified by said initialization signals, apparatus for initializing said remote station comprising means coupled to said interconnecting means for receiving and temporarily storing data transmitted by said host station, means coupled to said receiving and storing means for detecting receipt of said predetermined sequences of data characters, said detecting means comprising means for producing first reference signals in response to received data characters, resettable means for producing second reference signals, means for producing a sync signal in response to certain reference signals being produced by said first reference signal producing means, resettable synchronization means responsive to said sync signal for thereafter producing a comparator signal and a character clock signal each time a certain number of data bits are received from the host station, comparing means responsive to said comparator signal for comparing said first reference signals with said second reference signals, and for producing a match signal if the compared signals match and a mismatch signal if the compared signals do not match, means for producing a reset signal to reset said second reference signal producing means and said synchronization means in response to production of a mismatch signal, and means for producing initialization signals if at least a certain number of data characters are received and match signals only are produced, and for applying said initialization signals to said loading apparatus, the value of said initialization signals depending upon the predetermined sequence received.

2. Apparatus as in claim 1 wherein said first reference signal producing means comprises a first programmable read only memory means coupled to said receiving and storing means for producing said first reference signals, the coding of said first reference signals being dependent upon the coding of received data characters, and wherein said second reference signal producing means comprises character counter means for producing a count of the number of data characters received, said character counter means being responsive to each character clock signal to increment its count by one, and being responsive to said reset signal to reset itself to a reference count, and second programmable read only memory means responsive to the count produced by said character counter means for producing said second reference signals, the coding of said second reference signals being dependent upon the count of said character counter means.

3. Apparatus as in claim 2 wherein said synchronization means comprises first bistable means responsive to said sync signal for assuming a set condition and responsive to said reset signal for assuming a reset condition, and bit counter means responsive to said first bistable means assuming a set condition for counting data bits received from the host station and for producing said comparator signal and said character clock signal each time a certain count is reached.

4. Apparatus as in claim 3 wherein said comparing means comprises second bistable means for assuming a set condition in response to said comparator signal, and for assuming a reset condition a predetermined period of time thereafter, and means for comparing the reference signals produced by said first programmable read only memory means with the reference signals produced by said second programmable read only memory means and for producing, each time said second bistable means assumes the set condition, either a match signal, if the compared signals match, or mismatch signal, if the compared signals do not match.

5. Apparatus as in claim 4 wherein said reset signal producing means comprises third bistable means for assuming a set condition in response to a mismatch signal to thereby produce said reset signal.

6. Apparatus as in claim 5 wherein said initialization signal producing means comprises third programmable read only memory means coupled to said character counter means for producing a count signal when said character counter means reaches a certain count, fourth bistable means for assuming a set condition in response to said count signal to thereby produce an initialization signal, means for applying said initialization signal to said loading apparatus, and means for applying to said loading apparatus from said receiving and storing means at least some of the data received and stored therein.

7. Apparatus as in claim 2 further comprising third programmable read only memory means coupled to said character counter means for producing a first count signal when said character counter reaches a predetermined count, fifth bistable means for assuming a set condition in response to said first count signal, and a reset condition in response to a clear signal, means for preventing production of said reset signal when said fifth bistable means is in the set condition and said certain reference signals are produced, means for preventing application of character clock signals to said character counter means when said fifth bistable means is in the set condition, and means for applying a clear signal to said fifth bistable means in response to said first programmable read only memory means producing signals other than said certain reference signals.

8. Apparatus as in claim 7 wherein said third programmable read only memory means is adapted to produce a second count signal when said character counter means reaches a certain count greater than said predetermined count, and wherein said initialization signal producing means comprises initialization bistable means for assuming a set condition in response to said second count signal to thereby produce an initialization signal, means for applying said initialization signal to said loading apparatus, and means for applying to said loading apparatus at least a portion of the data stored in said receiving and storing means.

9. Apparatus for detecting a predetermined sequence of data characters transmitted over a transmission channel, said sequence including a plurality of synchronization characters followed by a plurality of identification characters, each character being composed of a plurality of data bits, said apparatus comprising means for receiving and storing data bits transmitted over said transmission channel, means for producing a sync signal when a particular sequence of bits is received, synchronization means responsive to said sync signal for thereafter producing a comparator signal each time a data character is received, said synchronization means comprising means coupled to said receiving and storing means for producing first reference signals in response to received data characters, the code value of said first reference signals being dependent upon the data characters received, and logic means for producing said sync signal in response to certain first reference signals being produced, means responsive to said comparator signals for comparing second reference signals with said first reference signals, and means for producing an initialization signal if a predetermined number of synchronization characters or more are received followed by a predetermined number of identification characters, and if the compared signals match.

10. Apparatus as in claim 9 wherein said synchronization means comprises a first bistable element settable to produce an enable signal in response to said sync signal, and resettable in response to a reset signal, and bit counter means responsive to said enable signal for counting the data bits of received data characters and for producing said comparator signal and a character clock signal each time a certain count is reached.

11. Apparatus as in claim 10 wherein said comparing means comprises character counter means for maintaining a count of received data characters, said character counter means being responsive to said character clock signal for incrementing its count by one, and being responsive to a reset signal for resetting to a reference count, means for producing second reference signals in response to the count produced by said character counter means, the code value of said second reference signals being dependent upon the count in said character counter means, and logic means for comparing the first reference signals with the second reference signals each time the comparator signal is produced, and for producing a match signal if the compared signals match and a mismatch signal if the compared signals do not match.

12. Apparatus as in claim 11 wherein said first reference signal producing means comprises a first programmable read only memory, and wherein said second reference signal producing means comprises a second programmable read only memory.

13. Apparatus as in claim 12 further comprising means responsive to said mismatch signal for producing a reset signal, and means for applying said reset signal to said character counter means and said first bistable element.

14. Apparatus as in claim 13 wherein said reset signal producing means comprises an error bistable element settable to produce said reset signal in response to said mismatch signal.

15. Apparatus as in claim 13 wherein said initialization signal producing means comprises a third programmable read only memory for producing a count signal when said character counter reaches a certain count, and an initialization bistable element settable to produce said initialization signal in response to said count signal.

16. Apparatus as in claim 15 wherein said third programmable read only memory is adapted to produce another count signal when said character counter means reaches a predetermined count which is less than said certain count, an idle bistable element settable to produce a disabling signal in response to said other count signal, and resettable in response to a clear signal, means responsive to said disabling signal for preventing production of said reset signal, means responsive to said disabling signal for preventing application of said character clock signal to said character counter means, and means responsive to said other count signal for producing said applying a clear signal to said idle bistable element when a data character containing other than said particular sequence of bits is received.

* * * * *